United States Patent
Yang

(10) Patent No.: US 12,363,718 B2
(45) Date of Patent: Jul. 15, 2025

(54) WIRELESS COMMUNICATION METHOD AND APPARATUS

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 349 days.

(21) Appl. No.: 17/561,745

(22) Filed: Dec. 24, 2021

(65) Prior Publication Data

US 2022/0116975 A1    Apr. 14, 2022

Related U.S. Application Data

(63) Continuation of application No. PCT/CN2019/095886, filed on Jul. 12, 2019.

(51) Int. Cl.
*H04W 72/21* (2023.01)
*H04W 52/36* (2009.01)
*H04W 72/1268* (2023.01)
*H04W 72/23* (2023.01)

(52) U.S. Cl.
CPC ......... *H04W 72/21* (2023.01); *H04W 52/367* (2013.01); *H04W 72/1268* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2017/0086219 A1* | 3/2017 | Lee | ......................... | H04W 72/12 |
| 2018/0199225 A1* | 7/2018 | Kim | ...................... | H04W 88/06 |
| 2019/0380132 A1* | 12/2019 | Hu | ........................... | H04W 4/70 |
| 2021/0345383 A1* | 11/2021 | Tesanovic | ............. | H04W 76/10 |
| 2022/0070722 A1* | 3/2022 | Wang | ................ | H04W 28/0289 |

(Continued)

FOREIGN PATENT DOCUMENTS

| | | |
|---|---|---|
| CN | 102132514 | 7/2011 |
| CN | 104285387 | 1/2015 |

(Continued)

OTHER PUBLICATIONS

"International Search Report (Form PCT/ISA/210) of PCT/CN2019/095886", mailed on Apr. 1, 2020, with English translation thereof, pp. 1-8.

(Continued)

*Primary Examiner* — Saumit Shah
(74) *Attorney, Agent, or Firm* — Hodgson Russ LLP

(57) ABSTRACT

The present application provides a wireless communication method and a device, which can supervise a network device to respond to the information reported by the terminal device. The method comprises: the terminal device sends a first message to the network device, the first message being used for assisting the network device to perform parameter configuration on the terminal device; the terminal device records first information, the first information comprising the response of the network device to the first message; the terminal device sends the first information to a network management system.

18 Claims, 5 Drawing Sheets

(56) References Cited

U.S. PATENT DOCUMENTS

2022/0183086 A1* 6/2022 Müller .................. H04W 72/12
2022/0322339 A1* 10/2022 Park ....................... G01K 1/026

FOREIGN PATENT DOCUMENTS

| CN | 106411659 | 2/2017 |
| CN | 108632884 | 10/2018 |
| WO | 2015178566 | 11/2015 |

OTHER PUBLICATIONS

"Written Opinion of the International Searching Authority (Form PCT/ISA/237) of PCT/CN2019/095886", mailed on Apr. 1, 2020, with English translation thereof, pp. 1-7.

* cited by examiner

WIRELESS COMMUNICATION METHOD AND APPARATUS

CROSS-REFERENCE TO RELATED APPLICATION

This application is a continuation of international PCT application serial no. PCT/CN2019/095886, filed on Jul. 12, 2019. The entirety of the above-mentioned patent application is hereby incorporated by reference herein and made a part of this specification.

BACKGROUND

Field of the Disclosure

The disclosure relates to the field of communication, and more specifically, to a wireless communication method and apparatus.

Description of Related Art

In a communication system, whether the terminal is in an idle state, an inactive state, or a connected state, all operations are performed in accordance with the configuration of the network device. During these operations, the terminal device can request the network device for parameter configuration by reporting to the network device. For example, a terminal device can report a buffer status report (BSR) to a network device to request uplink resources from the network device; or a terminal device can report terminal assistance information to the network device to request optimizing the parameter configuration of the terminal device.

However, after the terminal device reports to the network device, the network device may not schedule the terminal device or respond to the report of the terminal device due to various reasons. Such behavior of network devices, e.g., making no response or making no scheduling, may be caused by unfairness or discrimination. How to eliminate such unfair or discriminatory behaviors of network devices has become a problem that needs to be solved urgently.

SUMMARY OF THE DISCLOSURE

The disclosure provides a wireless communication method and device, which can urge the network device to respond to the information reported by the terminal device.

In the first aspect, a wireless communication method is provided, including: a terminal device sends a first message to a network device, the first message is used to assist the network device in parameter configuration of the terminal device; the terminal device records first information, the first information includes the response of the network device to the first message; the terminal device sends the first information to the network management system.

In the second aspect, a wireless communication method is provided, including: a network management system receives first information sent by a terminal device, and the first information includes the response of the network device to the first message sent by the terminal device to the network device; the network management system adjusts the response of the network device to the terminal device according to the first information.

In the aspect of a third party, a terminal device is configured for executing the method in the first aspect or in various implementation methods thereof.

Specifically, the terminal device includes a functional module for executing the method in the first aspect or various implementation methods thereof.

In the fourth aspect, a network management system is provided, which is configured to implement the method in the second aspect or various implementation methods thereof.

Specifically, the network management system includes a functional module for executing the method in the second aspect or various implementation methods thereof.

In the fifth aspect, a terminal device is provided, which includes a processor and a memory. The memory is configured to store a computer program, and the processor is configured to call and run the computer program stored in the memory to execute the method in the first aspect or various implementation methods thereof.

In the sixth aspect, a network management system is provided, which includes a processor and a memory. The memory is configured to store a computer program, and the processor is configured to call and run the computer program stored in the memory to execute the method in the second aspect or various implementation methods thereof.

In the seventh aspect, an apparatus is provided for implementing the method in any one of the foregoing first to second aspects or various implementation methods thereof.

Specifically, the apparatus includes: a processor for calling and running a computer program in the memory, so that the apparatus installed with the device executes the method in any one of the first aspect to the second aspect or various implementation methods thereof.

In the eighth aspect, a computer-readable storage medium is provided for storing a computer program, which enables the computer to execute the method in any one of the first aspect to the second aspect or various implementation methods thereof.

In the ninth aspect, a computer program product is provided, which includes computer program instructions that enable a computer to execute the method in any one of the first aspect to the second aspect or various implementation methods thereof.

In the tenth aspect, a computer program is provided. When the computer program is run on a computer, the computer executes the method in any one of the first aspect to the second aspect or various implementation methods thereof.

In the technical solution provided by the disclosure, after the terminal device sends the first information to the network device, that is, after reporting the information, the response of the network device to the first information can be recorded, and the recorded first information is reported to the network management system, so as to facilitate the network management system to urge the network device to respond to the reported information sent by the terminal device.

DESCRIPTION OF EMBODIMENTS

Figure 1:
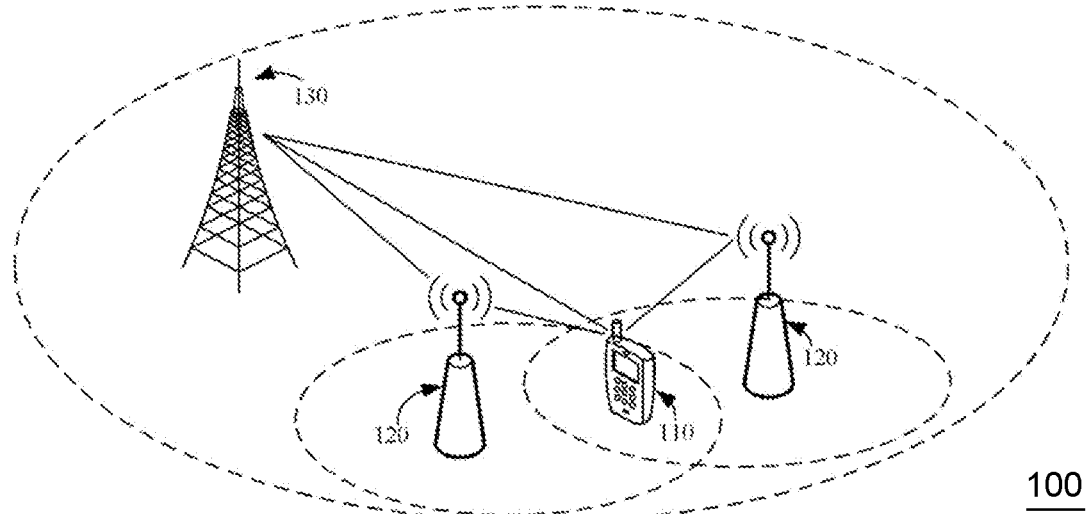
FIG. 1 is a schematic diagram of a wireless communication system to which the embodiment of the disclosure is applied.

FIG. 1 is a schematic diagram of a system 100 according to an embodiment of the disclosure.

As shown in FIG. 1, the terminal device 110 is connected to the first network device 130 under the first communication system and the second network device 120 under the second communication system. For example, the first network device 130 is a network device under Long Term Evolution (LTE), the second network device 120 is a network device under New Radio (NR).

The first network device 130 and the second network device 120 may include multiple communities.

It should be understood that FIG. 1 is an example of a communication system in the embodiment of the disclosure, and the embodiment of the disclosure is not limited to that shown in FIG. 1.

As an example, the communication system to which the embodiment of the disclosure is adapted may include at least multiple network devices under the first communication system and/or multiple network devices under the second communication system.

For example, the system 100 shown in FIG. 1 may include a main network device under the first communication system and at least one assistance network device under the second communication system. At least one assistance network device is respectively connected to one main network device to form multiple connections, and is connected to the terminal device 110 respectively to provide services therefor. Specifically, the terminal device 110 can simultaneously establish a connection through the main network device and the assistance network device.

Optionally, the connection established between the terminal device 110 and the main network device is the main connection, and the connection established between the terminal device 110 and the assistance network device is the assistance connection. The control signaling of the terminal device 110 can be transmitted through the main connection, and the data of the terminal device 110 can be transmitted through the main connection and the assistance connection simultaneously, or through the assistance connection only.

In another example, the first communication system and the second communication system in the embodiment of the disclosure are different, but the disclosure provides no limitation to the specific types of the first communication system and the second communication system.

For example, the first communication system and the second communication system may be various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Time Division Duplex (TDD), Universal Mobile Telecommunication System (UMTS), etc.

The main network device and the assistance network device may be any access network device.

Optionally, in some embodiments, the access network device may be a base transceiver station in the Global System of Mobile communication (GSM) system or Code Division Multiple Access (CDMA), it can also be a NodeB (NB) in a Wideband Code Division Multiple Access (WCDMA) system, or an Evolutional Node B, eNB or eNodeB in a Long Term Evolution (LTE) system.

Optionally, the access network device may also be a Next Generation Radio Access Network (NG RAN), or a gNB in an NR system, or a wireless controller in a Cloud Radio Access Network (CRAN), or the access network device can be a relay station, an access point, a vehicle-mounted device, a wearable device, or a network device in future evolved Public Land Mobile Network (PLMN), etc.

In the system 100 shown in FIG. 1, the first network device 130 is configured as the main network device, and the second network device 120 is configured as the assistance network device as an example.

The first network device 130 may be an LTE network device, and the second network device 120 may be an NR network device. Or, the first network device 130 may be an NR network device, and the second network device 120 may be an LTE network device. Or both the first network device 130 and the second network device 120 can be NR network devices. Or, the first network device 130 may be a GSM network device, a CDMA network device, etc., and the second network device 120 may also be a GSM network device, a CDMA network device, etc. Or the first network device 130 may be a macrocell, and the second network device 120 may be a microcell, picocell, femtocell, or the like.

Optionally, the terminal device 110 may be any terminal device, and the terminal device 110 includes but is not limited to:

Being connected via wired lines, such as via Public Switched Telephone Networks (PSTN), Digital Subscriber Line (DSL), digital cable, direct cable connection; and/or another data connection/network; and/or via a wireless interface, such as for cellular networks, Wireless Local Area Network (WLAN), digital TV networks such as DVB-H networks, satellite networks, AM-FM broadcast transmitters; and/or a device of another terminal device that is set to receive/send communication signals; and/or an Internet of Things (IoT) device. A terminal device set to communicate via a wireless interface may be called a "wireless communication terminal", a "wireless terminal" or a "mobile terminal". Examples of mobile terminals include, but are not limited to, satellite or cellular phones; Personal Communications System (PCS) terminals that can integrate cellular radio phones and data processing, fax, and data communication capabilities; can include radio phones, pagers, and the Internet/Intranet access, Web browser, memo pad, calendar, and/or PDA with Global Positioning System (GPS) receiver; and conventional laptop and/or palmtop receiver or other electronic devices including radio phone transceiver. Terminal device can refer to access terminal, User Equipment (UE), user unit, user station, mobile station, mobile stage, remote station, remote terminal, mobile device, user terminal, terminal, wireless communication device, user agent or user equipment. The access terminal can be a cellular phone, a cordless phone, a Session Initiation Protocol (SIP) phone, a Wireless Local Loop (WLL) station, a personal digital assistant (PDA), a handheld device with wireless communication function, computing devices or other processing devices connected to wireless modems, vehicle-mounted devices, wearable devices, terminal devices in the 5G network, or terminal devices in the future evolved PLMN.

It should be understood that the terms "system" and "network" in this disclosure are often used interchangeably in this disclosure.

With the continuous evolution and assistance of wireless communication technology, the Internet of Things (IoT) technology has developed rapidly. For example, the machine type communication (MTC)/enhanced MTC (eMTC) and IoT series standards promoted by the 3rd generation partnership project (3GPP) organization have become candidate technical standards for 5G massive MTC technology. These technical standards are expected to play an important role in all aspects of people's production and lives, such as smart homes, smart cities, smart factories, remote monitoring, and smart transportation.

In the existing cellular network (such as LTE, NR), whether the terminal device is in an idle state, an inactive state, or in a connected state, the terminal device operates in accordance with the network configuration. For example, when the terminal device is in an idle state, the terminal device performs community selection and reselection according to the network configuration. In another example, when the terminal device is in the inactive state, the terminal device updates the RAN notification area (RNA) of the radio access network (RAN) according to the network configuration. Still in another example, when the terminal device is in the connected state, the terminal device performs operations such as bearer establishment, data transmission, and community switching according to the network configuration.

In all the above operations, terminal device reporting is essential. The report types of terminal devices can be roughly divided into three categories:

The first category: basic report of the terminal device.

This type of information is reported for the terminal device to complete basic operations, such as measurement report that is performed if the terminal device expects the network to immediately give a switch command, or a scheduling request or a buffer status report (BSR) that is sent if the terminal device expects the network to instantly provide an uplink data scheduling.

The second category: the terminal device assists the network device to optimize the report.

In the current wireless network, because there are thousands of network parameters, during the network parameter configuration process, there are problems that the parameter configuration is complicated, and some parameters are difficult to coordinate or easy to be mismatched.

Therefore, in the research process of LTE and NR, operators put forward the concept of self-optimization network (SON), expecting that the network can automatically plan and optimize the network parameters based on the information such as parameters reporting from the terminal and the statistical information from the network. Typical SON functions include: physical cell identity (PCI) self-configuration, neighbor community relationship self-configuration, mobile robustness optimization, etc.

PCI self-configuration means that in LTE/NR networks, the physical community identification number is a more difficult parameter to configure. The main reason is that the network topology is more complex. In addition, due to the continuous expansion and overlap of the network, the density of the community increases, and therefore the possibility of collisions caused by repeated use of PCI is increased, that is, neighboring communities use the same PCI. In conventional solutions, manual configuration for PCI is adopted. However, as the network topology continues to grow and the number of communities in the network continues to increase, the cost of manual configuration continues to increase, and the possibility of configuration errors continues to raise. Therefore, PCI collision problems can be avoided through terminal device reporting or interaction between network base stations for automatic coordination.

Neighbor relation is another type of parameter that is difficult to configure. The main reason is that the network topology is constantly changing, and due to the continuous expansion and overlap of the network, the topology is more complicated, which leads to constant change of the relationship between communities, and the configuration is more complicated. If the conventional manual approach is adopted, the configuration complexity is very high, and the possibility of mismatching is relatively high. Therefore, the relationship between neighboring communities can be established or updated through automatic coordination.

Mobility robustness optimization is proposed for the complicated configuration of switch parameters. In cellular networks, the most complicated parameter configuration is switch parameter configuration. Switch parameters have various problems such as mismatch, missing configuration, and unreasonable configuration. Therefore, the switch parameter configuration of base stations can be optimized through reporting from the terminal device or the interaction between the base stations.

The third category: reports that optimize the experience of the terminal device.

The third type of reported information is for the status of the terminal device. This type of information can be called UE assistance information. For example, the network device can instruct the terminal device to report through a reconfiguration message, and the terminal device can report UE assistance information to the network device.

The UE assistance information may include the parameters expected by the terminal device. After the terminal device sends the UE assistance information to the network device, it is expected that the network device can configure the terminal device according to the parameters in the UE assistance information.

Taking LTE as an example, three types of UE assistance information reporting are introduced for the terminal side, as described below.

1. The terminal-oriented power optimization configuration, the main function of which is that when the power of the terminal device is low, it is expected that the network can be configured with a more power-saving network configuration.

2. The terminal-oriented maximum physical uplink shared channel (PUSCH) bandwidth and/or physical downlink shared channel (PDSCH) bandwidth, the main function of which is directed to the condition where the amount of terminal data is small and it is desired to save power, and the expected result is that the network can transmit data according to the small bandwidth actually expected by the terminal.

3. The terminal overheating indication, the main function of which is to use the indication and the given preference parameters to expect that the network can be configured according to the parameters when the terminal device is overheated, so as to reduce the heat generation of the terminal.

In the NR system, assistance information similar to the aforementioned UE assistance information is also introduced.

Among the above three types of reporting types, for the terminal device, the terminal device is concerned with the first type of reporting and the second type of reporting. However, for the network device, the network device is concerned about the second type of reporting, because this type of reporting can reduce costs for network maintenance and improve network performance. However, no matter how the terminal device reports, the actual configuration parameters of the final network still depend on the network. Therefore, network devices will attach great importance to the second type of network optimization and reporting, so as to respond as quickly and well as possible for configuration adjustments. However, for the first type of reporting, that is, basic report from the terminal, the network makes a response to this type of report sometimes, but sometimes does not make a response due to network configuration. For example, for some terminal devices, even though BSR has been reported, the network might still not schedule the terminal device due to various reasons. For the third type of reporting, that is, terminal experience optimization report, the network may not give a response. The network might not give a response to the preference parameters of the terminal device due to objective reasons (such as high processing complexity) or subjective reasons (such as non-realization of network or unwillingness in realizing optimization).

Such behavior of the terminal device, e.g., making no response or making no scheduling, may be unfair and unreasonable. For example, the network device does not schedule or respond to the report from a certain type of terminal device, but performs normal scheduling and making response to other types of terminal devices, which results in unfair behaviors for this type of terminal device. Therefore, how to solve this unfair or discriminatory behavior has become an urgent problem to be solved.

Figure 2:
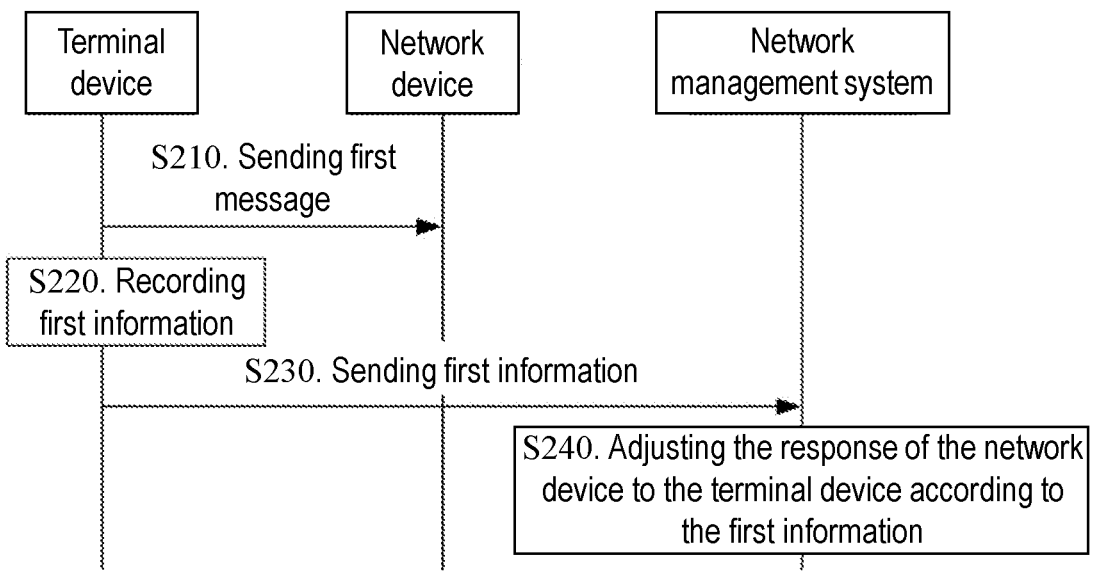
FIG. 2 is a schematic flowchart of a wireless communication method provided by an embodiment of the disclosure.

The embodiment of the disclosure provides a wireless communication method that can urge the network to respond to or make scheduling to terminal reports, so as to eliminate such unfair or discriminatory behavior performed by the network. As shown in FIG. 2, the method includes steps S210 to S240.

S210. The terminal device sends a first message to the network device, and the first message is configured to assist the network device in parameter configuration for the terminal device.

The first message may be any one of the three types of report messages described above.

For example, the first message may be a report message of the first type. The first message may include measurement information, and the first message may be configured to assist the network device in sending a switch command to the terminal device; or the first message may include a scheduling request or BSR, and the first message may be configured to assist the network device in scheduling uplink resources to the terminal device.

In another example, the first message may be a third type of report message. The first message may include configuration parameters expected by the terminal device, and the first message is configured to assist the network device to configure parameters for the terminal device according to the configuration parameters expected by the terminal device.

Certainly, if the network device also has the problem that the configuration or optimization of the second type of report message is not timely, the first type of message may also be the second type of report message.

S220. The terminal device records the first information. The first information includes the response of the network device to the first message.

The response of the network device to the first message may include at least one of the following: whether the network device responds to the first message, the time when the network device responds to the first message, the content of the response made by the network device to the first message, and whether the response made by the network device to the first message meets the needs of the terminal device.

The first information may further include the content contained in the first message sent by the terminal device to the network device, and the update or change of the requirements made by the terminal device for configuration parameters before recording of the first information is stopped. That is to say, in addition to the response of the network device to the BSR, the first information further includes information about the resources requested by the terminal device to the network device, which is helpful for the network management system to determine whether the scheduling made by the network device meets the needs of the terminal device.

S230. The terminal device sends the first information to the network management system.

S240. The network management system adjusts the response of the network device to the terminal device according to the first information.

The terminal device reports the recorded first information to the network management system, so that the network management system can count the reported content for the terminal device, so as to determine whether the network device's behavior is unreasonable, unfair or discriminatory.

If the network management system, based on a large amount of results reported by the terminal device, finds that the network device makes no scheduling or no response only to a certain type of terminal device, or makes scheduling or response inactively only to a certain type of terminal device, then the network management system can determine that the network device has unreasonable, unfair or discriminatory behavior against this type of terminal device.

If such behavior of the network device in making no scheduling or response is only an incidental behavior that is performed at a certain moment or in a certain scenario for a non-specific individual terminal device, the network management system can determine that the behavior of the network device is not unreasonable, unfair or discriminatory.

The network management system in the embodiment of the disclosure may be, for example, an operator network, or the network management system may be a network operation administration and maintenance (OAM) entity.

The embodiment of the disclosure uses the terminal to report feedback, so that the network management system can know the response or scheduling made by the network device, thereby urging the network device to make response or make scheduling to address the report from the terminal device, which facilitates to eliminate the unfair or discriminatory behavior performed by the network device.

The following describes the content included in the first message and the first message with reference to specific circumstances.

In an example, the first message may be used to request the network device to allocate uplink resources, and the first message may include a B SR and/or a scheduling request.

If the first message includes the first BSR, and the first BSR is used to indicate the current amount of uplink buffered data of the terminal device, then the first message can be used to instruct the network device to allocate uplink resource for the terminal device according to the amount of uplink buffered data of the terminal device.

The terminal device can record first information, and the first information may include at least one of the following information: the amount of uplink grant resources scheduled by the network device, the time of at least one uplink grant resource scheduled by the network device, the time for the terminal device to send at least one BSR, the amount of data reported by the at least one BSR, the amount of data dropped by the terminal device, the time when the terminal device drops the data, and whether the terminal device receives the uplink grant resources scheduled by the network device within a preset time.

Specifically, the at least one BSR includes the first BSR. That is to say, after the terminal device sends the first BSR and before the recording of the first information is stopped, the amount of uplink buffered data of the terminal device changes, and the terminal device can further report the new BSR to the network device.

The amount of uplink resources scheduled by a network device may be recorded by using a physical resource block (PRB) and/or the number of bits that can be carried by an uplink grant resource. In other words, the amount of uplink grant resources can use PRB and/or the number of bits as the measurement unit. When recording the amount of uplink grant resources, the terminal device can record the PRB included in the uplink grant resource, or record the number of bits that the uplink grant resource can carry.

The amount of uplink resources scheduled by the network device may include the amount of uplink resources scheduled by the network device at a time for the terminal device, and the sum of the amount of uplink resources scheduled multiple times by the network device for the terminal device. For example, after the terminal device sends the first BSR, the network device schedules uplink resources two times for the terminal device. The terminal device can record the amount of uplink resources scheduled by the network device to the terminal device during the two times of uplink resource scheduling. In addition, the terminal device may further record the sum of the amount of uplink resources scheduled twice by the network device to the terminal device.

The first information may include the time for the network device to schedule at least one uplink grant resource. If the terminal device schedules two uplink resources, the terminal device can record the two times of scheduling of the uplink resources respectively.

The scheduling time for the terminal device to record the uplink resource can be an absolute time or a relative time. The relative time can be, for example, relative to the time when the first BSR is sent, that is, the time interval between the time when the terminal device receives the uplink resource scheduling and the time when the terminal device sends the first BSR.

The first information may further include the time when the terminal device sends the at least one BSR and/or the amount of data reported by the at least one BSR. The at least one BSR may include the first BSR, and the terminal device may record the time when the terminal device sends the first BSR. The time of recording the first BSR can be used to determine how long the network device will schedule uplink resources to the terminal device after the terminal device sends the first BSR.

If the terminal device sends other BSRs to the network device after sending the first BSR and before stopping recording the first information, the terminal device may further record the sending time of other BSRs to facilitate the network management system to perform statistical analysis subsequently.

The amount of data reported by the at least one BSR can be used to determine whether the uplink resources scheduled by the network device for the terminal device can match the resources required by the terminal device.

The first information may include the data dropped by the terminal device and/or the time when the terminal device drops the data. After the terminal device sends the first BSR, if part of the stored data to be sent still fails to be sent due to timeout, the terminal device can drop this part of the data. The terminal device can record the time of dropping data and the amount of dropped data, and report it to the network management system, which facilitates the network management system to perform statistical analysis subsequently.

The first information may include whether the network device schedules uplink resources for the terminal device within a preset time. For example, after the terminal device sends the first BSR, a timer can be activated. If the network device schedules uplink resources to the terminal device within the time preset by the timer, the scheduling can be recorded as successful; if the network device fails to schedule uplink resources to the terminal device within the time preset by the timer, the terminal device can record the scheduling as failure.

If the network device schedules uplink resources to the terminal device before the timer expires, the terminal device can further record information such as the amount and time of the scheduled uplink resources described above.

The embodiment of the disclosure provides no specific limitation to the time when the terminal device stops recording the first information. For example, in the case that the uplink resources allocated by the network device for the terminal device satisfy the requirement of the terminal device, the terminal device may stop recording the first information. Specifically, if the difference between the amount of data reported by the terminal device through at least one BSR and the amount of data dropped by the terminal device is equal to the amount of data that can be carried by the uplink resource scheduled by the network device for the terminal device, the terminal device can stop recording the first information. In another example, a timer can be set, and after the timer expires, the terminal device stops recording the first information.

The order described below does not represent an actual execution order, and the embodiments of the disclosure may be executed in any possible order.

First Embodiment (1) The terminal device sends the first BSR to the network device, and the terminal device records the time point of sending the first BSR.

The time point when the terminal device records the sending of the first BSR may be an absolute time point or a relative time point. The absolute time point may be recorded in a time stamp, for example, and the relative time point may be recorded by using, for example, the time point of sending the first BSR as the starting point.

The time points recorded below are all consistent with the method of recording the time point of sending the first BSR. If the first BSR is recorded in absolute time, the following time points are all recorded in absolute time; if the first BSR is recorded in relative time, then the following time points are also recorded in relative time.

(2) The terminal device receives the first uplink schedule sent by the network device, and the terminal device can record the time when the first uplink schedule is received and the amount of resources scheduled.

(3) The terminal device receives the second uplink schedule sent by the network device, and the terminal device can record the time when the second uplink schedule is received and the amount of resources scheduled.

(4) In the above process, if part of the data stored by the terminal device has expired but still failed to be sent, the terminal device can drop this part of the data. Under the circumstances, the terminal device can record the amount of dropped data and the time of dropping the data.

(5) Repeat the above process until the amount of data reported by the terminal device through the first BSR is cleared, that is, when the amount of data reported by the first BSR−the amount of dropped data=the amount of uplink resources allocated by the network device, the terminal device can stop recording the first information.

(6) The terminal device can report the recorded first information to the network management system.

Second Embodiment (1) The terminal device sends the first BSR to the network device, and the terminal device records the time point of sending the first BSR.

The time point when the terminal device records the sending of the first BSR may be an absolute time point or a relative time point. The absolute time point may be recorded in a time stamp, for example, and the relative time point may be recorded by using, for example, the time point of sending the first BSR as the starting point.

(2) The terminal device receives the first uplink schedule sent by the network device, and the terminal device can record the time when the first uplink schedule is received and the amount of resources scheduled.

(3) Due to the involvement of more information, the terminal device can send a second BSR to the network device, and the terminal device records the time of sending the second BSR and the amount of data reported by the second BSR.

(4) The terminal device receives the second uplink schedule sent by the network device, and the terminal device can record the time when the second uplink schedule is received and the amount of resources scheduled.

(5) In the above process, if part of the data stored by the terminal device has expired but still failed to be sent, the terminal device can drop this part of the data. Under the circumstances, the terminal device can record the amount of dropped data and the time of dropping the data.

(6) Repeat the above process until the amount of data reported by the first BSR and the second BSR is clear, that is, when the amount of data reported by the first BSR+the amount of data reported by the second B SR—the amount of dropped data=the amount of uplink resources allocated by the network device, the terminal device stops recording the first information.

In another example, the first message may include UE assistance information, which is used to assist the network device in optimizing the configuration parameters of the terminal device. For example, the UE assistance information may include configuration parameters expected by the terminal device. In this case, the first information may include at least one of the following information: whether the network device sends a response for the UE assistance information to the terminal device within a preset time, the time when the network device sends the response for the UE assistance information to the terminal device, whether the network device configures the terminal device with the configuration parameters expected by the terminal device, the parameters actually configured by the network device to the terminal device, and whether the parameters configured directed at the UE assistance information by the network device to the terminal device are valid.

The terminal device may send UE assistance information to the network device when there is some preference for the network configuration, and the assistance information may include the configuration parameters preferred by the terminal device. For example, the terminal device can send UE assistance information to the network device when the power consumption is too large, the heat generation is too large, or the power is low. It is expected that the network device configures low-configuration parameters for the terminal device, thereby optimizing the experience of the terminal device.

For example, if the current power of the terminal device is very low, the terminal device hopes that the network device reduces the configuration of the terminal device without features such as high power, dual channel transmission, carrier aggregation, etc. In another example, if the current heat generation of the terminal device is large, the terminal device hopes that the network device reduces the configuration of the terminal device without features such as multiple antennas and multiple carriers.

After the terminal device sends the UE assistance information, in order to determine whether the network device's response behavior is unfair or discriminatory, the terminal device may record the first information.

The configuration parameters expected by the terminal device may include at least one of the following: reduced bandwidth size, used bandwidth size, reduced number of antennas, number of transmitting antennas, number of receiving antennas, whether to use carrier aggregation, the number of used carriers, and the number of transmission channels.

The configuration parameters expected by the terminal device may include parameters that the terminal device actually needs to use, or the configuration parameters expected by the terminal device may include the size that the terminal device expects to be adjusted on the basis of the previous configuration parameters.

For example, the terminal device can directly tell the network device the size of the parameter expected to be configured. For example, the terminal device can directly tell the network device the size of the bandwidth expected to be configured, the number of transmitting antennas expected to be used, the number of receiving antennas expected to be used, whether carrier aggregation is expected to be used, the number of carriers expected to be used, and/or the number of transmission channels expected to be used, etc.

In another example, based on the previous parameter configuration, the terminal device can tell the network device whether to reduce the configuration of the terminal device or increase the configuration of the terminal device and so on. For example, the terminal device can tell the network device to reduce the bandwidth, reduce the number of transmitting antennas, reduce the number of receiving antennas, reduce the number of carriers used, and/or reduce the number of transmission channels. In addition, the terminal device can further tell the network device to adjust the size of the parameter. For example, the terminal device can tell the network device the reduced size of the bandwidth, the reduced number of antennas, and/or the reduced number of carriers.

The first information recorded by the terminal device may include whether the network device has responded to the UE assistance information. Specifically, the first information may include whether the network device has responded to the UE assistance information within a preset time. The terminal device can activate a timer after sending the UE assistance information. If the network device responds to the UE assistance information before the timer expires, the terminal device can record that the response is successful; if the network device does not respond to the UE assistance information before the timer expires, the terminal device can record that the response is failed.

If the network device responds to the UE assistance information, the terminal device can further record the response time of the network device, so that the network management system can perform statistical analysis subsequently to determine whether the network device's response to the terminal device is inactive.

If the network device responds to the UE assistance information, the terminal device can further record whether the network device configures the terminal device with configuration parameters expected by the terminal device. If the network device makes configuration according to the parameters expected by the terminal device, the terminal device can record that the assistance is successful; if the network device does not make configuration according to the parameters expected by the terminal device, the terminal device can record that the assistance is failed.

The configuration made by the network device according to the parameters expected by the terminal device may include that the parameters configured by the network device to the terminal device are completely consistent or partially consistent with the configuration parameters expected by the terminal device. For example, the terminal device requests to reduce the bandwidth and the number of transmitting antennas, but the network device only reduces the number of transmitting antennas without reducing the bandwidth. In this case, it can still be regarded that the network device makes configuration according to the parameters expected by the terminal device.

In addition, if the network device responds to the UE assistance information, the terminal device can further record the parameters actually configured by the network device to the terminal device.

The configuration parameters included in the UE assistance information are parameters that the terminal device expects to be configured by the network device in order to solve its own problems. However, the parameters in the UE assistance information are determined by the terminal device itself. It is not clear whether these parameters are valid and whether they can solve the current problems of the terminal device. Therefore, the accuracy of the information in the UE assistance information can be recorded, that is, the first information can further include whether the parameters of the UE assistance information configured by the network device to the terminal device are valid.

Whether the parameters of the UE assistance information configured by the network device to the terminal device are valid may be determined according to: whether the situation in which the terminal device triggers the terminal device to send the UE assistance information within a preset time is improved. For example, if the terminal device sends the UE assistance information to the network device due to excessive power consumption, after the network device configures the terminal device with its desired configuration parameters, if the power consumption of the terminal device improves, that is, the power consumption is reduced compared to previous power consumption, it means that the parameters in the UE assistance information are valid, and such parameters can solve the problem of excessive power consumption of the terminal device. If the terminal device sends the UE assistance information to the network device due to excessive heat generation, after the network device configures the terminal device with its desired configuration parameters, if the heat generation of the terminal device does not improve, that is, the heat generation does not decrease compared to previous heat generation, it means that the parameters in the UE assistance information are invalid, and such parameters cannot solve the problem of excessive heat generation of the terminal device.

For example, whether the parameters of the UE assistance information configured by the network device to the terminal device are valid can be reflected by the reduction range and/or reduction speed of power consumption, the reduction range and/or reduction speed of heat generation. If reduction range and/or reduction speed of power consumption is greater than the preset value, it might indicate that the parameters in the UE assistance information are valid, or if the reduction range and/or reduction speed of heat generation is greater than the preset value, it might indicate that the parameters in the UE assistance information are valid.

Whether the parameters of the UE assistance information configured by the network device to the terminal device are valid can be reflected by at least one of the following: the reduction range of power consumption of the terminal device is greater than the first threshold, the reduction range of heat generation of the terminal device is greater than the second threshold, the reduction speed of the power consumption of the terminal device is greater than the third threshold, and the reduction speed of the heat generation of the terminal device is greater than the fourth threshold.

After receiving the parameters of the UE assistance information configured by the network device, the terminal device can measure power consumption and/or heat generation. Specifically, the terminal device can measure power consumption and/or heat generation at different times. If the reduction range of the power consumption of the terminal device is greater than the first threshold, or the reduction speed of the power consumption of the terminal device is greater than the third threshold, the terminal device can determine that the parameters in the UE assistance information are valid. If the reduction range of the heat generation of the terminal device it is greater than the second threshold, or the reduction speed of the heat generation of the terminal device is greater than the fourth threshold, the terminal device can determine that the parameters in the UE assistance information are valid.

It should be noted here that if the terminal device sends the UE assistance information to the network device due to excessive power consumption, the terminal device can only perform detection on the power consumption of the terminal device after the network device configures the parameters for the UE assistance information. If the terminal device sends the UE assistance information to the network device due to excessive heat generation, the terminal device can only perform detection on the heat generation of the terminal device after the network device configures the parameters for the UE assistance information. However, the disclosure is not limited thereto. The terminal device can measure the heat generation and power consumption both, because in some cases, the heat generation can also reflect the power consumption to a certain extent.

The first threshold, the second threshold, the third threshold, and/or the fourth threshold may be configured by the network device to the terminal device, or may also be determined by the terminal device itself, the disclosure provides no limitation thereto.

Recording whether the parameters of the UE assistance information configured by the network device to the terminal device are valid can help the terminal device to adjust the subsequently desired parameters, so as to improve the current status of the terminal device. In addition, after the terminal device reports the information to the network management system, the network management system can adjust the parameters of the terminal device, so as to configure the terminal device with its required parameters more precisely. For example, the network management system can adjust the parameter configuration of the terminal device according to the information reported by the other terminal device. If other terminal devices are also optimized for parameters due to excessive power consumption, some terminal devices solve the problem of excessive power consumption by reducing the number of transmitting antennas, but the terminal device cannot solve the problem of excessive power consumption by reducing the bandwidth, then the network management system can reduce the number of transmitting antennas of the terminal device through the network device, thereby improving the current status of the terminal device.

The description is given below with reference to specific embodiments.

(1) The terminal device activates the first timer while reporting UE assistance information.
(2) If the network device gives feedback directed at the UE assistance information before the first timer expires, the terminal device can record that the assistance is successful and releases the first timer; if the network device does not give feedback directed at the UE assistance information before the first timer expires, the terminal device can record that the assistance is failed.
(3) If the network device provides feedback directed at the UE assistance information, and the network device adjusts the network configuration according to the configuration parameters expected by the terminal device, the terminal device can activate the second timer while releasing the first timer and observe whether the adjusted parameters of the network device are valid.
(4) If the condition of the terminal device is relieved before the second timer expires, such as the reduction range of power consumption is greater than the first threshold, or the reduction range of heat generation is greater than the second threshold, it indicates that the parameters in the UE assistance information sent by the terminal device are accurate.

The embodiment of the disclosure provides no specific limitation to the duration of the first timer and the second timer. The first timer and the second timer may be configured by the network device for the terminal device, or may be determined by the terminal device itself.

The embodiment of the disclosure records the time when the network device schedules uplink resources, which can facilitate the network management system to determine whether the scheduling behavior of the network device is inactive. In addition, by recording the time when the network device schedules uplink resources, it can be determined whether the uplink resource insufficiently scheduled for the terminal device by the network device is caused by limited resources or the unfair behavior of the network device. In the same duration, if the network device has fewer uplink scheduling resources for all terminal devices, the network management system can determine that the scheduling behavior of the network device is caused by objective reasons (insufficient resources). In the same duration, if the network device only allocates fewer uplink resources for a certain type of terminal device, the network management system can determine that the scheduling behavior of the network device is unfair.

The embodiment of the disclosure provides no specific limitation to the timing for the terminal device to record the first information. For example, the terminal device can record the scheduling or response behavior of all network devices. In another example, the terminal device can determine which scheduling or response behaviors of the network device to record according to its own implementation. In still another example, the terminal device can record the behavior of the network device after the network device instructs according to the configuration of the network device, so as to save the resource overhead recorded by the terminal device and the signaling overhead for reporting.

Figure 3:
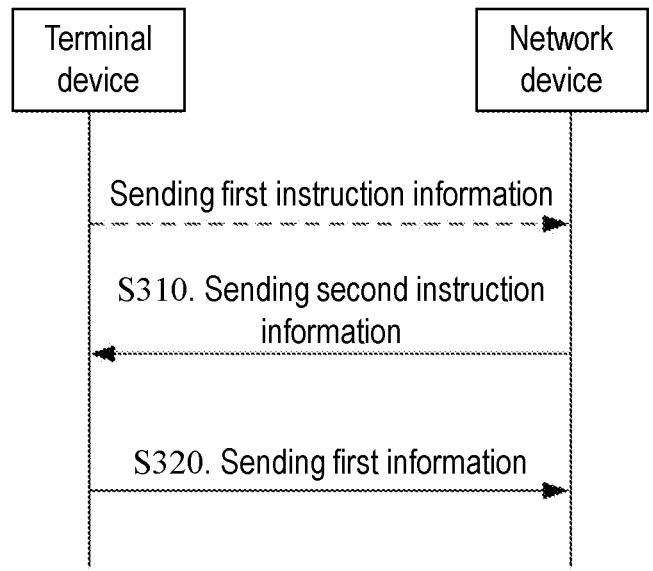
FIG. 3 is a schematic flowchart of a method for sending first information provided by an embodiment of the disclosure.

As shown in FIG. 3, FIG. 3 shows the manner in which the terminal device records and reports the first information based on the configuration of the network device. The method includes steps S310 to S320.

S310. The network device sends second instruction information to the terminal device, and the second instruction information is used to instruct the terminal device to report the first information.

S320. After receiving the second instruction information, the terminal device sends the first information to the network device. Thereafter, the network device can forward the first information to the network management system.

Optionally, the network device sending the second instruction information to the terminal device may be based on a request of the terminal device, that is, before S310, the terminal device may further send a first instruction message to the network device. The first instruction information is used to indicate that the terminal device has first information to be reported.

The first instruction information can further be used to indicate the data amount of the first information, and the data amount of the first information can be used by the network device to allocate uplink resources that match the data amount of the first information to the terminal device. After the network device receives the first instruction information sent by the terminal device, it can allocate a suitable uplink resource to the terminal device, and the terminal device can send the first information on the uplink resource.

The network device can send second instruction information to the terminal device through access stratum (AS) signaling, such as a radio resource control (RRC) reconfiguration message; or the network device can use NAS signaling to send the second instruction information to the terminal device.

In the embodiment of the disclosure, the network device may instruct the terminal device to record and report the first information simultaneously through the second instruction information; or the network device may instruct the terminal device to record the first information through the third instruction information, and instruct the terminal device to report the first information through the second instruction information.

For example, the terminal device may record the first information when receiving the third instruction information, and send the first information to the network management system when receiving the second instruction information.

The first instruction information and/or the first information may be sent through at least one of the following messages: a user plane message, a control plane message, and a non-access stratum (NAS) message. Specifically, the first instruction information is carried in the resource of the uplink data sent by the terminal device and/or in the RRC reconfiguration complete message.

The three methods are described below.

Figure 4:
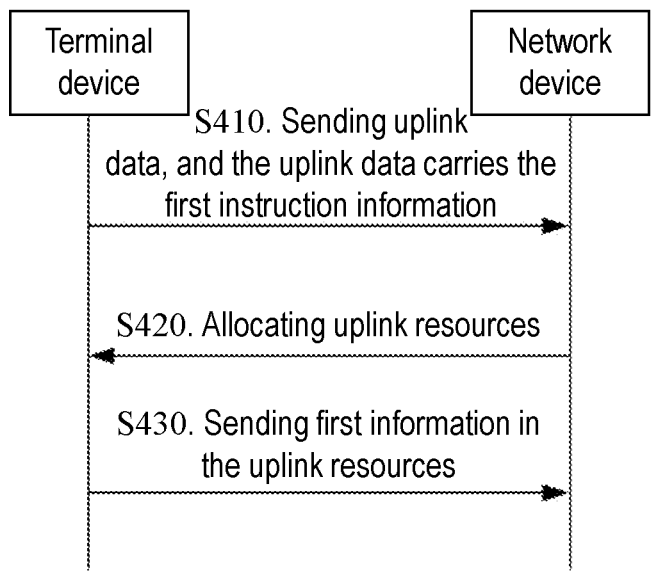
FIG. 4 is a schematic flowchart of another method for sending first information provided by an embodiment of the disclosure.

Method 1: The terminal device reports the first instruction information through the user plane message. As shown in FIG. 4, the method may include steps S410 to S430.

S410. The terminal device can send the first instruction information to the network device while sending the uplink data. For example, the terminal device can send the first instruction information to the network device along with the last part of the data, to carry the first instruction information in the uplink data, and the first instruction information can be used to instruct that the first information recorded by the terminal device needs to be reported.

S420. The network device allocates uplink resources to the terminal device according to the first instruction information.

S430. The terminal device reports the first information on the uplink resources allocated by the network device. That is, the first information is sent in the uplink resource.

Figure 5:
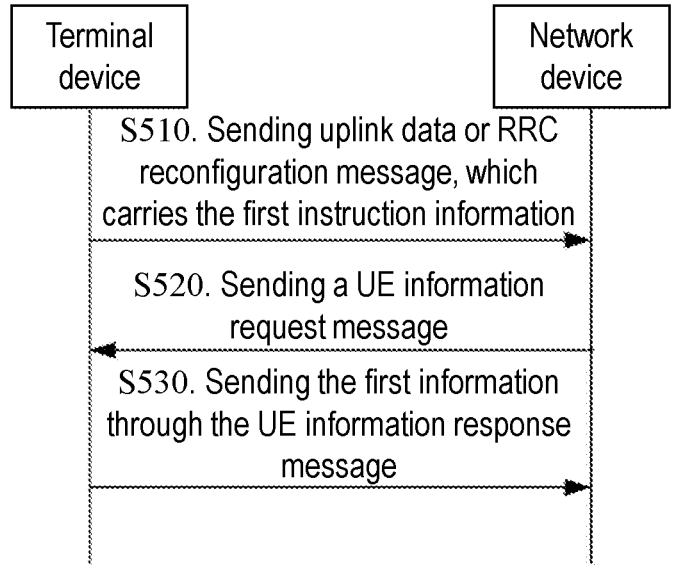
FIG. 5 is a schematic flowchart of still another method for sending first information provided by an embodiment of the disclosure.

Method 2: The terminal device reports the first instruction information through the control plane message. As shown in FIG. 5, the method may include steps S510 to S530.

S510. The terminal device may send the first instruction information by using the method shown in FIG. 4, indicating that the terminal device has first information to report; or the terminal device may further send the first instruction information to the network device through the RRC reconfiguration complete message, indicating that the terminal device has the first information to report.

Specifically, the network device may be a base station, for example.

S520. After the network device receives the first instruction information sent by the terminal device, or after the network device configures the third instruction information to the terminal device and instructs the terminal device to record the first information, the network device may send the second instruction information to the terminal device. The second instruction information may adopt a UE Information Request (UEInformationRequest) approach to instruct the terminal device to report the first information.

S530. The terminal device may send the first information to the network device. For example, the terminal device may send first information through a UE Information Response (UEInformationResponse). That is, reporting the first information to the network device.

Figure 6:
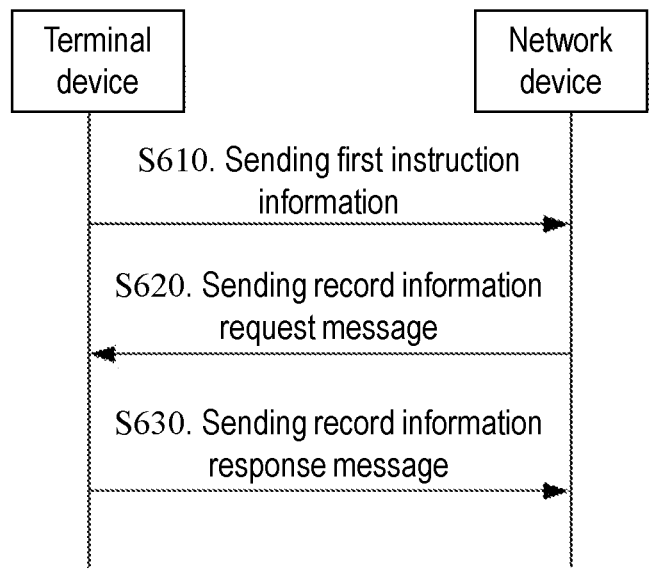
FIG. 6 is a schematic flowchart of yet another method for sending first information provided by an embodiment of the disclosure.

Method 3: The terminal device reports the first instruction information through the NAS message. As shown in FIG. 6, the method may include steps S610 to S630.

S610. The terminal device sends first instruction information to the network device, indicating that the terminal device has first information to report. The first instruction information may be sent to the network device by using the method shown in FIG. 4, or the first instruction information may be sent to the network device by using the method shown in FIG. 5.

Specifically, the network device may be, for example, a core network device.

S620. The network device sends second instruction information to the terminal device. The second instruction information may be carried in a record information request message, for example.

S630. The terminal device may send the first information to the network device based on the second instruction information, and the first information may be carried in the record information response message.

It should be noted that the uplink resources in the embodiments of the disclosure may refer to uplink grant resources.

The method for community access according to the embodiment of the disclosure is described in detail above. The device described in the embodiment of the disclosure will be described below with reference to FIG. 7 to FIG. 11. The technical features described in the method embodiment are applicable to the following device implementation example.

Figure 7:
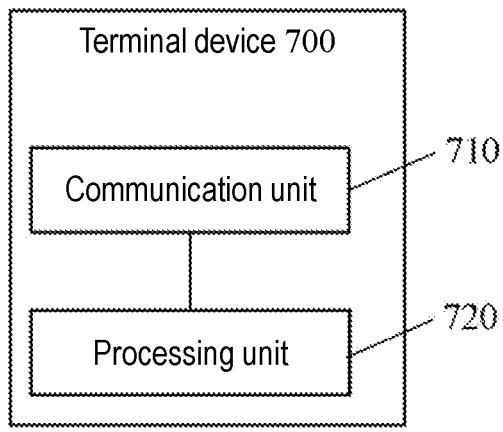
FIG. 7 is a schematic block diagram of a terminal device provided by an embodiment of the disclosure.

FIG. 7 is a schematic block diagram of a terminal device embodied in an embodiment of the disclosure. The terminal device may be any of the terminal devices described above. The terminal device 700 in FIG. 7 includes a communication unit 710 and a processing unit 720, specifically:

The communication unit 710 is configured to send a first message to a network device, and the first message is used to assist the network device in parameter configuration of the terminal device.

The processing unit 720 is configured to record first information, and the first information includes the response of the network device to the first message.

The communication unit 710 is further configured to send the first information to the network management system.

Optionally, the first message includes a first buffer status report BSR, and the first information includes at least one of the following information: whether the network device schedules an uplink grant resource for the terminal device within a preset time, the amount of uplink grant resources scheduled by the network device, the time for the network device to schedule at least one uplink grant resource, the time for the terminal device to send at least one BSR, the amount of data reported by the at least one BSR, the amount of data dropped by the terminal device, the time when the terminal device drops the data, and the at least one BSR includes the first BSR.

Optionally, the amount of uplink grant resources is recorded by using a physical resource block PRB and/or the number of bits that can be carried by the uplink grant resource.

Optionally, the processing unit 720 is further configured to: under the condition that the difference between the amount of data reported by the terminal device in the at least one BSR and the amount of data dropped by the terminal device is equal to the amount of data that can be carried in the uplink grant resources scheduled by the network device, recording of the first information is stopped.

Optionally, the at least one BSR includes a BSR sent to the network device by the terminal device in a duration from sending the first BSR to stopping recording the first information.

Optionally, the first message includes user equipment UE assistance information, the UE assistance information includes configuration parameters expected by the terminal device, and the first information includes at least one of the following information: whether the network device sends a response for the UE assistance information to the terminal device within a preset time, the time when the network device sends a response for the UE assistance information to the terminal device, whether the network device configures the terminal device with the configuration parameters expected by the terminal device, the parameters actually configured by the network device for the terminal device, and whether the parameters for the UE assistance information configured by the network device for the terminal device are valid.

Optionally, the configuration parameters expected by the terminal device include at least one of the following: reduced size of bandwidth, size of used bandwidth, reduced number of antennas, number of transmitting antennas, number of receiving antennas, whether to use carrier aggregation, the number of carriers used, and the number of transmitting channels.

Optionally, whether the parameters for the UE assistance information configured by the network device to the terminal device are valid can be determined according to: whether the situation in which the terminal device triggers the terminal device to send the UE assistance information within a preset time is improved.

Optionally, whether the response for the UE assistance information sent by the network device to the terminal device is valid can be reflected by at least one of the following: the reduction range of the power consumption of the terminal device is greater than the first threshold, the reduction range of the heat generation of the terminal device is greater than the second threshold, the reduction speed of the power consumption of the terminal device is greater than the third threshold, and the reduction speed of the heat generation of the terminal device is greater than the fourth threshold.

Optionally, the first information is carried in at least one of the following messages: a user plane message, a control plane message, and a non-access stratum NAS message.

Optionally, the communication unit 710 is further configured to perform the following operations: sending first instruction information to the network device, the first instruction information is used to indicate that the terminal device has the first information that needs to be reported; sending the second instruction information to the terminal device, the second instruction information is used to instruct the terminal device to report the first information.

Optionally, the first instruction information is further used to indicate the size of the data amount of the first information, and the size of the data amount of the first information is used for the network device to configure the uplink resource that matches the size of the data amount of the first information for the terminal device.

Optionally, the first instruction information is carried in at least one of the following: a resource from which the terminal device sends uplink data, a radio resource control RRC reconfiguration complete message, a user plane message, and a NAS message.

Optionally, the communication unit 710 is further configured to: receive third instruction information sent by the network device; the processing unit 720 is configured to: record the first information when the terminal device receives the third instruction information.

Optionally, the network device is a base station and/or a core network device.

Figure 8:
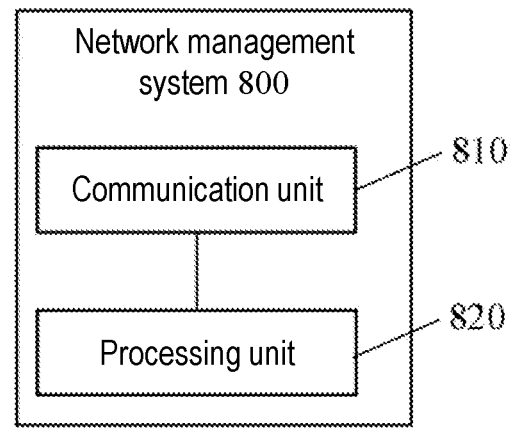
FIG. 8 is a schematic block diagram of a network management system provided by an embodiment of the disclosure.

FIG. 8 is a schematic block diagram of a network management system embodied in an embodiment of the disclosure. The network management system may be any of the network management systems described above. The network management system 800 of FIG. 8 includes a communication unit 810 and a processing unit 820, specifically:

The communication unit 810 is configured to receive first information sent by a terminal device, the first information includes a response of the network device to the first message sent by the terminal device to the network device.

The processing unit 820 is configured to adjust the response of the network device to the terminal device according to the first information.

Optionally, the first message includes a first buffer status report BSR, and the first information includes at least one of the following information: whether the network device schedules an uplink grant resource for the terminal device within a preset time, the amount of uplink grant resources scheduled by the network device, the time for the network device to schedule at least one uplink grant resource, the time for the terminal device to send at least one BSR, the amount of data reported by the at least one BSR, the amount of data dropped by the terminal device, the time when the terminal device drops the data, and the at least one BSR includes the first BSR.

Optionally, the amount of uplink grant resources is recorded by using a physical resource block PRB and/or the number of bits that can be carried by the uplink grant resources.

Optionally, the at least one BSR includes a BSR sent to the network device by the terminal device in a duration from sending the first BSR to stopping recording the first information.

Optionally, the first message includes user equipment UE assistance information, the UE assistance information includes configuration parameters expected by the terminal device, and the first information includes at least one of the following information: whether the network device sends a response for the UE assistance information to the terminal device within a preset time, the time when the network device sends a response for the UE assistance information to the terminal device, whether the network device configures the terminal device with the configuration parameters expected by the terminal device, the parameters actually configured by the network device for the terminal device, and whether the parameters for the UE assistance information configured by the network device for the terminal device are valid.

Optionally, the configuration parameters expected by the terminal device include at least one of the following: reduced size of bandwidth, size of used bandwidth, reduced number of antennas, number of transmitting antennas, number of receiving antennas, whether to use carrier aggregation, the number of carriers used, and the number of transmitting channels.

Optionally, whether the parameters for the UE assistance information configured by the network device to the terminal device are valid can be determined according to: whether the situation in which the terminal device triggers the terminal device to send the UE assistance information within a preset time is improved.

Optionally, whether the response for the UE assistance information sent by the network device to the terminal device is valid can be reflected by at least one of the following: the reduction range of the power consumption of the terminal device is greater than the first threshold, the reduction range of the heat generation of the terminal device is greater than the second threshold, the reduction speed of the power consumption of the terminal device is greater than the third threshold, and the reduction speed of the heat generation of the terminal device is greater than the fourth threshold.

Optionally, the first information is carried in at least one of the following messages: a user plane message, a control plane message, and a non-access stratum NAS message.

Optionally, the network device is a base station and/or a core network device.

Figure 9:
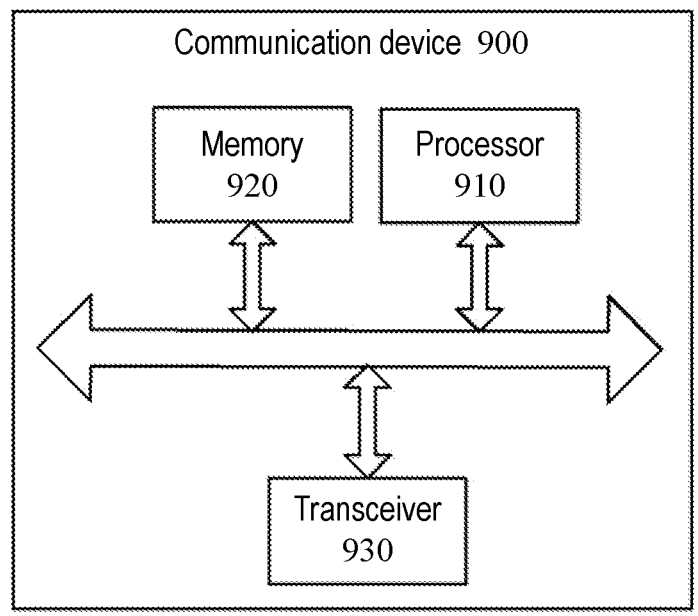
FIG. 9 is a schematic structural diagram of a communication device in an embodiment of the disclosure.

FIG. 9 is a schematic structural diagram of a communication device 900 embodied in an embodiment of the disclosure. The communication device 900 shown in FIG. 9 includes a processor 910, and the processor 910 can call and run a computer program in the memory to implement the method in the embodiment of the disclosure.

Optionally, as shown in FIG. 9, the communication device 900 may further include a memory 920. The processor 910 can call and run a computer program in the memory 920 to implement the method in the embodiment of the disclosure.

The memory 920 may be a separate device independent of the processor 910, or may be integrated in the processor 910.

Optionally, as shown in FIG. 9, the communication device 900 may further include a transceiver 930, and the processor 910 may control the transceiver 930 to communicate with other devices. Specifically, the transceiver 930 may send information or data to other devices, or receive information or data sent by other devices.

Specifically, the transceiver 930 may include a transmitter and a receiver. The transceiver 930 may further include an antenna, and the number of antennas may be one or more.

Optionally, the communication device 900 may specifically be a network device in an embodiment of the disclosure, and the communication device 900 may implement the corresponding process implemented by the network device in various methods of the embodiments of the disclosure. For conciseness, no further description is incorporated herein.

Optionally, the communication device 900 may specifically be a network management system according to an embodiment of the disclosure, and the communication device 900 may implement the corresponding process implemented by the network management system in various methods of the embodiments of the disclosure. For conciseness, no further description is incorporated herein.

Optionally, the communication device 900 may specifically be a mobile terminal/terminal device according to an embodiment of the disclosure, and the communication device 900 may implement the corresponding process implemented by the mobile terminal/terminal device in various methods of the embodiments of the disclosure. For conciseness, no further description is incorporated herein.

Figure 10:
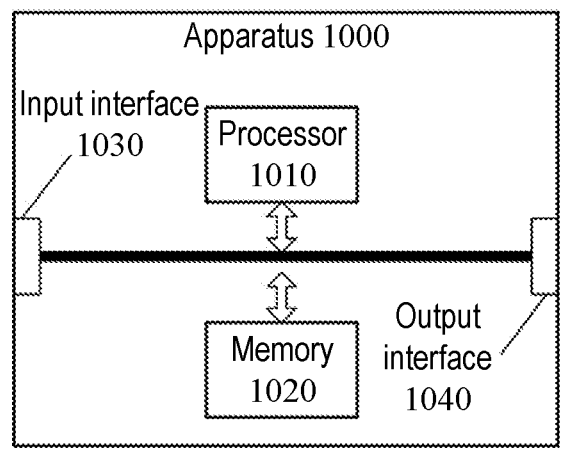
FIG. 10 is a schematic structural diagram of a communication device according to an embodiment of the disclosure.

FIG. 10 is a schematic structural diagram of an apparatus embodied in an embodiment of the disclosure. The apparatus 1000 shown in FIG. 10 includes a processor 1010, and the processor 1010 can call and run a computer program in the memory to implement the method in the embodiment of the disclosure.

Optionally, as shown in FIG. 10, the apparatus 1000 may further include a memory 1020. The processor 1010 can call and run a computer program in the memory 1020 to implement the method in the embodiment of the disclosure.

The memory 1020 may be a separate device independent of the processor 1010, or may be integrated in the processor 1010.

Optionally, the apparatus 1000 may further include an input interface 1030. The processor 1010 can control the input interface 1030 to communicate with other devices or an apparatus. Specifically, the input interface 1030 can obtain information or data sent by other devices or apparatus.

Optionally, the apparatus 1000 may further include an output interface 1040. The processor 1010 can control the output interface 1010 to communicate with other devices or an apparatus. Specifically, the output interface 1040 can output information or data to other devices or apparatus.

Optionally, the apparatus can be applied to the network device in the embodiments of the disclosure, and the apparatus can implement the corresponding processes implemented by the network device in the various methods of the embodiments of the disclosure. For conciseness, no further details are not incorporated herein.

Optionally, the apparatus can be applied to the network management system in the embodiment of the disclosure, and the apparatus can implement the corresponding process implemented by the network management system in various methods of the embodiments of the disclosure. For conciseness, no further details are not incorporated herein.

Optionally, the apparatus can be applied to the mobile terminal/terminal device in the embodiment of the disclosure, and the apparatus can implement the corresponding process implemented by the mobile terminal/terminal device in various methods of the embodiments of the disclosure. For conciseness, no further details are not incorporated herein.

It should be understood that the apparatus mentioned in the embodiments of the disclosure may be a chip, and the chip may also be referred to as a system-level chip, a system chip, a chip system, or a system-on-chip.

Figure 11:
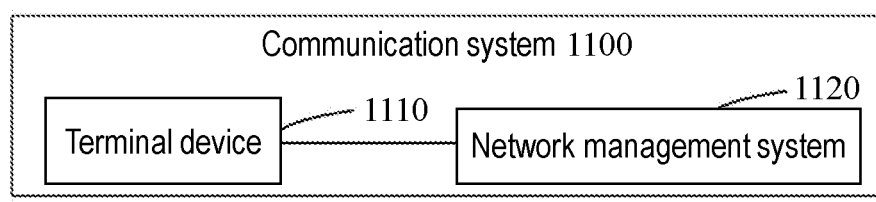
FIG. 11 is a schematic block diagram of a communication system according to an embodiment of the disclosure.

FIG. 11 is a schematic block diagram of a communication system 1100 embodied in an embodiment of the disclosure. As shown in FIG. 11, the communication system 1100 includes a terminal device 1110 and a network management system 1120.

Specifically, the terminal device 1110 can be used to implement the corresponding functions implemented by the terminal device in the above method, and the network management system 1120 can be used to implement the corresponding functions implemented by the network device in the above method. No further details are not incorporated herein.

It should be understood that the processor of the embodiment of the disclosure may be an integrated circuit chip, which has signal processing capabilities. In the implementation process, the steps of the above method embodiments can be completed by integrated logic circuits of hardware in the processor or instructions in the form of software. The processor may be a general-purpose processor, a Digital Signal Processor (DSP), an Application Specific Integrated Circuit (ASIC), an on-shelf Field Programmable Gate Array (FPGA), or other programmable logic devices, discrete gates or transistor logic devices, discrete hardware components. The methods, steps, and logical block diagrams disclosed in the embodiments of the disclosure can be implemented or executed. The general-purpose processor may be a microprocessor or the processor may also be any conventional processor or the like. The steps of the method disclosed in the embodiments of the disclosure can be directly embodied as being executed by a hardware decoding processor, or executed by a combination of hardware and software modules in the decoding processor. The software module can be located in random memory, flash memory, read-only memory, programmable read-only memory, or electrically readable and writable programmable memory, registers, and other well-developed storage media in the field. The storage medium is located in the memory, and the processor reads the information in the memory and completes the steps of the above method in combination with its hardware.

It can be understood that the memory in the embodiments of the disclosure may be volatile memory or non-volatile memory, or may include both volatile and non-volatile memory. Specifically, non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache memory. By way of exemplary but not restrictive description, many forms of RAM may be adopted, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). It should be noted that the memory of the systems and methods described herein is intended to include but not limited to these and any other types of memory applicable.

It should be understood that the above-mentioned memory is exemplary but not limited thereto. For example, the memory in the embodiment of the disclosure may also be static RAM (SRAM), dynamic RAM (DRAM), synchronous DRAM (SDRAM), double data rate SDRAM (DDR SDRAM), enhanced SDRA (ESDRAM), synch link DRAM (SLDRAM), and Direct Rambus RAM (DR RAM), etc. That is to say, the memory in the embodiments of the disclosure is intended to include but not limited to these and any other types of memory applicable.

The embodiment of the disclosure further provides a computer-readable storage medium for storing computer programs.

Optionally, the computer-readable storage medium can be applied to the network device in the embodiment of the disclosure, and the computer program enables the computer to execute the corresponding process implemented by the network device in various methods of the embodiments of the disclosure. For conciseness, no further details are incorporated herein.

Optionally, the computer-readable storage medium can be applied to the mobile terminal/terminal device in the embodiment of the disclosure, and the computer program enables the computer to execute the corresponding process implemented by the mobile terminal/terminal device in various methods of the embodiments of the disclosure. For conciseness, no further details are incorporated herein.

The embodiment of the disclosure further provides a computer program product, including computer program instructions.

Optionally, the computer program product can be applied to the network device in the embodiment of this disclosure, and the computer program instructions enable the computer to execute the corresponding process implemented by the network device in various methods of the embodiments of this disclosure. For conciseness, no further details are incorporated herein.

Optionally, the computer program product can be applied to the mobile terminal/terminal device in the embodiment of this disclosure, and the computer program instructions enable the computer to execute the corresponding process implemented by the mobile terminal/terminal device in various methods of the embodiments of this disclosure. For conciseness, no further details are incorporated herein.

The embodiment of the disclosure further provides a computer program.

Optionally, the computer program can be applied to the network device in the embodiment of the disclosure. When the computer program is run on the computer, the computer executes the corresponding processes implemented by the network device in the various methods of the embodiments of the disclosure. For conciseness, no further details are incorporated herein.

Optionally, the computer program can be applied to the mobile terminal/terminal device in the embodiment of this disclosure. When the computer program is run on the computer, the computer can execute the corresponding process implemented by the mobile terminal/terminal device in various methods of the embodiments of this disclosure. For conciseness, no further details are incorporated herein.

Those of ordinary skill in the art may realize that the units and algorithm steps described in the examples in combination with the embodiments disclosed herein can be implemented by electronic hardware or a combination of computer software and electronic hardware. Whether these functions are implemented in the form of hardware or software depends on the specific application and design conditions of the technical solution. Practitioners in the art can use different methods to implement the described functions for each specific application, but such implementation should not be construed as extending beyond the scope of this disclosure.

Those skilled in the art can clearly understand that, for the convenience and conciseness of description, the specific operating process of the system, apparatus and unit described above can be derived from the corresponding process in the foregoing method embodiment, and no further description is incorporated herein.

In the several embodiments provided in this disclosure, it should be understood that the system, apparatus, and method disclosed herein may be implemented in other ways. For example, the apparatus embodiments described above are merely illustrative. For example, the division of the units is only a division of logical function, and there may be other divisions in actual implementation, for example, multiple units or elements may be combined or may be integrated into another system, or some features can be ignored or not implemented. In addition, the mutual coupling or direct coupling or communication connection that is shown or discussed may be indirect coupling or communication connection through some interfaces, apparatus or units, and may be in electrical, mechanical or other forms.

The units described as separate components may or may not be physically separated, and the components shown as units may or may not be physical units, that is, they may be located in a place, or they may be distributed to multiple network units. Some or all of the units may be selected according to actual needs to achieve the purpose of the solutions of the embodiments.

In addition, the functional units in various embodiments of the disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the disclosure essentially or the part that contributes to the existing technology or the part of the technical solution can be embodied in the form of a software product. The computer software product is stored in a storage medium, including several instructions which are used to enable a computer device (which may be a personal computer, a server, or a network device, etc.) to execute all or part of the steps of the methods described in the various embodiments of the disclosure. The aforementioned storage medium includes: U disk, removable hard disk, Read-Only Memory (ROM), Random Access Memory (RAM), magnetic disks or optical disks, etc., which can store program codes.

The above are only specific implementations of this application, but the scope to be protected by this disclosure is not limited thereto. Any person skilled in the art can easily think of changes or substitutions within the technical scope disclosed in this disclosure, and the changes or substitutions should fall within the scope to be protected by the disclosure. Therefore, the scope to be protected by the disclosure shall be subject to the scope of claims.

What is claimed is:

1. A wireless communication method, comprising:
sending, by a terminal device, a first message to a network device, the first message being used to assist the network device in parameter configuration of the terminal device;
recording, by the terminal device, first information, the first information comprising a response of the network device to the first message;
sending, by the terminal device, the first information to a network management system, wherein the first message comprises a first buffer status report (BSR), and the first information comprises at least one of the following information: whether the network device schedules an uplink grant resource for the terminal device within a preset time, an amount of the uplink grant resources scheduled by the network device, a time for the network device to schedule the at least one uplink grant resource, a time for the terminal device to send at least one BSR, an amount of data reported by the at least one BSR, an amount of data dropped by the terminal device, a time when the terminal device drops the data, and the at least one BSR comprises the first BSR;
wherein the method further comprises the following:
under a condition that a difference between the amount of data reported by the terminal device in the at least one BSR and the amount of data dropped by the terminal device is equal to the amount of data that can be carried in the uplink grant resources scheduled by the network device, recording of the first information is stopped.

2. The method according to claim 1, wherein the amount of the uplink grant resources is recorded by using a physical resource block (PRB) and/or a number of bits that can be carried by the uplink grant resource.

3. The method according to claim 2, wherein the at least one BSR comprises a BSR sent to the network device by the terminal device in a duration from sending the first BSR to stopping recording the first information.

4. The method according to claim 1, wherein the first message comprises user equipment (UE) assistance information, the UE assistance information comprises configuration parameters expected by the terminal device, and the first information comprises at least one of the following information: whether the network device sends a response for the UE assistance information to the terminal device within a preset time, a time when the network device sends a response for the UE assistance information to the terminal device, whether the network device configures the terminal device with the configuration parameters expected by the terminal device, parameters actually configured by the network device for the terminal device, and whether the parameters for the UE assistance information configured by the network device for the terminal device are valid.

5. The method according to claim 4, wherein the configuration parameters expected by the terminal device comprise at least one of the following: a reduced size of bandwidth, a size of used bandwidth, a reduced number of antennas, a number of transmitting antennas, a number of receiving antennas, whether to use carrier aggregation, a number of carriers used, and a number of transmitting channels.

6. The method according to claim 4, wherein whether the parameters for the UE assistance information configured by the network device to the terminal device are valid can be determined according to: whether a situation in which the terminal device triggers the terminal device to send the UE assistance information within a preset time is improved.

7. The method according to claim 4, wherein whether the response for the UE assistance information sent by the network device to the terminal device is valid can be reflected by at least one of the following: a reduction range of power consumption of the terminal device is greater than a first threshold, a reduction range of a heat generation of the terminal device is greater than a second threshold, a reduction speed of the power consumption of the terminal device is greater than a third threshold, and a reduction speed of the heat generation of the terminal device is greater than a fourth threshold.

8. The method according to claim 1, further comprising:
sending, by the terminal device, first instruction information to the network device, the first instruction information being used to indicate that the terminal device has the first information that needs to be reported;
sending, by the network device, second instruction information to the terminal device, the second instruction information being used to instruct the terminal device to report the first information.

9. The method according to claim 1, further comprising:
receiving, the terminal device, third instruction information sent by the network device; the third instruction information being used to instruct the terminal device to record the first information;
recording, by the terminal device, the first information, comprising:
recording, the terminal device, the first information when the terminal device receives the third instruction information.

10. A wireless communication method, comprising:
receiving, by a network management system, first information sent by a terminal device, and the first information comprising a response of a network device to a first message sent by the terminal device to the network device, wherein the first message comprises a first buffer status report (BSR), and the first information comprises at least one of the following information: whether the network device schedules an uplink grant resource for the terminal device within a preset time, an amount of the uplink grant resources scheduled by the network device, a time for the network device to schedule the at least one uplink grant resource, a time for the terminal device to send at least one BSR, an amount of data reported by the at least one BSR, an amount of data dropped by the terminal device, a time when the terminal device drops the data, and the at least one BSR comprises the first BSR, wherein under a condition that a difference between the amount of data reported by the terminal device in the at least one BSR and the amount of data dropped by the terminal device is equal to the amount of data that can be carried in the uplink grant resources scheduled by the network device, recording of the first information is stopped;

adjusting, by the network management system, the response of the network device to the terminal device according to the first information.

11. The method according to claim 10, wherein the amount of the uplink grant resources is recorded by using a physical resource block (PRB) and/or a number of bits that can be carried by the uplink grant resource.

12. The method according to claim 10, wherein the at least one BSR comprises a BSR sent to the network device by the terminal device in a duration from sending the first BSR to stopping recording the first information.

13. The method according to claim 10, wherein the first message comprises user equipment (UE) assistance information, the UE assistance information comprises configuration parameters expected by the terminal device, and the first information comprises at least one of the following information: whether the network device sends a response for the UE assistance information to the terminal device within a preset time, a time when the network device sends a response for the UE assistance information to the terminal device, whether the network device configures the terminal device with the configuration parameters expected by the terminal device, parameters actually configured by the network device for the terminal device, and whether the parameters for the UE assistance information configured by the network device for the terminal device are valid.

14. The method according to claim 13, wherein the configuration parameters expected by the terminal device comprise at least one of the following: a reduced size of bandwidth, a size of used bandwidth, a reduced number of antennas, a number of transmitting antennas, a number of receiving antennas, whether to use carrier aggregation, a number of carriers used, and a number of transmitting channels.

15. The method according to claim 13, wherein whether the parameters for the UE assistance information configured by the network device to the terminal device are valid can be determined according to: whether a situation in which the terminal device triggers the terminal device to send the UE assistance information within a preset time is improved.

16. The method according to claim 13, wherein whether the response for the UE assistance information sent by the network device to the terminal device is valid can be reflected by at least one of the following: a reduction range of power consumption of the terminal device is greater than a first threshold, a reduction range of a heat generation of the terminal device is greater than a second threshold, a reduction speed of the power consumption of the terminal device is greater than a third threshold, and a reduction speed of the heat generation of the terminal device is greater than a fourth threshold.

17. A terminal device, comprising:
a communication circuit, configured to send a first message to a network device, wherein the first message is used to assist the network device in parameter configuration of the terminal device; and a processor, configured to record first information, wherein the first information comprises a response of the network device to the first message;

wherein the communication circuit is further configured to send the first information to a network management system, the first message comprises a first buffer status report (BSR), and the first information comprises at least one of the following information: whether the network device schedules an uplink grant resource for the terminal device within a preset time, an amount of the uplink grant resources scheduled by the network device, a time for the network device to schedule the at least one uplink grant resource, a time for the terminal device to send at least one BSR, an amount of data reported by the at least one BSR, an amount of data dropped by the terminal device, a time when the terminal device drops the data, and the at least one BSR comprises the first BSR;

wherein under a condition that a difference between the amount of data reported by the terminal device in the at least one BSR and the amount of data dropped by the terminal device is equal to the amount of data that can be carried in the uplink grant resources scheduled by the network device, recording of the first information is stopped.

18. A network management system, comprising:
a communication circuit, configured to receive first information sent by a terminal device, wherein the first information comprises a response of a network device to the first message sent by the terminal device to the network device, the first message comprises a first buffer status report (BSR), and the first information comprises at least one of the following information: whether the network device schedules an uplink grant resource for the terminal device within a preset time, an amount of the uplink grant resources scheduled by the network device, a time for the network device to schedule the at least one uplink grant resource, a time for the terminal device to send at least one BSR, an amount of data reported by the at least one BSR, an amount of data dropped by the terminal device, a time when the terminal device drops the data, and the at least one BSR comprises the first BSR, wherein under a condition that a difference between the amount of data reported by the terminal device in the at least one BSR and the amount of data dropped by the terminal device is equal to the amount of data that can be carried in the uplink grant resources scheduled by the network device, recording of the first information is stopped; and a processor, configured to adjust the response of the network device to the terminal device according to the first information.

* * * * *